United States Patent [19]

Cocco et al.

[11] Patent Number: 4,961,942

[45] Date of Patent: * Oct. 9, 1990

[54] SHELF-STABLE MULTI-TEXTURED COOKIES

[75] Inventors: Mark V. Cocco, Bloomfield; Robert E. Ross, Wayne; Robert R. Thulin, Wyckoff, all of N.J.

[73] Assignee: Nabisco Brands, Inc., East Hanover, N.J.

[ * ] Notice: The portion of the term of this patent subsequent to Oct. 9, 2007 has been disclaimed.

[21] Appl. No.: 191,771

[22] Filed: May 2, 1988

Related U.S. Application Data

[63] Continuation of Ser. No. 702,083, Feb. 15, 1985, abandoned.

[51] Int. Cl.$^5$ ............................................. A21D 13/00
[52] U.S. Cl. ....................................... 426/94; 426/549; 426/560; 426/658; 426/659; 426/653
[58] Field of Search ................. 426/549, 560, 94, 658, 426/659, 653

[56] References Cited

U.S. PATENT DOCUMENTS

| | | | |
|---|---|---|---|
| 4,344,969 | 8/1982 | Youngquist et al. | 426/18 |
| 4,444,799 | 4/1984 | Vanderveer et al. | 426/549 |
| 4,455,333 | 6/1984 | Hong et al. | 426/94 |
| 4,503,080 | 3/1985 | Brabbs et al. | 426/94 |
| 4,511,318 | 4/1985 | Kolodesh et al. | 426/94 |
| 4,514,430 | 4/1985 | Hartman | 426/549 |
| 4,624,856 | 11/1986 | Vanderveer | 426/549 |
| 4,892,745 | 1/1990 | Gage et al. | 426/549 |

FOREIGN PATENT DOCUMENTS

| | | |
|---|---|---|
| 0098642 | 1/1984 | European Pat. Off. . |
| 0119824 | 3/1984 | European Pat. Off. . |
| 0119826 | 3/1984 | European Pat. Off. . |
| 0138414 | 9/1984 | European Pat. Off. . |
| 0163496 | 5/1985 | European Pat. Off. . |
| 2740245 | 3/1978 | Fed. Rep. of Germany ...... 426/549 |

OTHER PUBLICATIONS

Farm Journal's "Complete Home Baking Book" by Elise W. Manning, Doubleday & Company, Inc., Garden City, N.Y., 1979.

Pyler, Baking Science & Technology, 1973, published by Seebel Publ. Co.: Chicago, Ill., pp. 432–433.

Primary Examiner—Joseph Golian

[57] ABSTRACT

Cookies having a shelf-stable plurality of textures are prepared from a composite dough comprising a filler cookie dough laminated to a casing cooking dough. The casing dough comprises lactose and/or dextrose and less than 75% by weight sucrose, based upon the sugar solids content of the casing dough. The filler dough comprises a humectant for imparting softness or chewiness to the inner portion of the cookie. The casing dough is baked to a soft or tender textured crumb structure. The water content of the filler dough is greater than the water content of the casing dough to facilitate control over the moisture content of the cookie. Cookies baked from dough pieces having a filler dough enrobed by a casing dough retain a firm and tender textured crumb structure on the outside and a soft or chewy textured crumb structure on the inside for extended times in proper packaging when the dough pieces are baked to an end-point moisture content of at least about 6% by weight, based upon the weight of the cookie.

32 Claims, No Drawings

SHELF-STABLE MULTI-TEXTURED COOKIES

This application is a continuation of application Ser. No. 702,083, filed Feb. 15, 1985, now abandoned.

FIELD OF THE INVENTION

This invention relates to cookies having a shelf-stable plurality of textures. It also relates to processes and dough compositions for making the multi-textured cookies.

BACKGROUND OF THE INVENTION

The sweetness provided by lactose and dextrose is about 40% and 70%–80%, respectively, of the sweetness provided by sucrose, as measured in a 15% sugar solution. The relative sweetness may be even less in cookies. See Pancoast et al, *Handbook of Sugars*, 2nd ed., AVI Publishing, Co., Inc., Westport, Conn., pages 367 and 388 (1980). Additionally, dextrose and lactose are reducing sugars. They undergo Maillard-type browning reactions with proteins in the flour, for instance. Lactose may also cause allergic reactions in some individuals depending on the amount consumed. Levels contained in a glass of milk (about 8.5 gms) are reported as not causing harm to those exhibiting lactose-intolerance because they lack the enzyme lactase. See Ash, D. J., "Research On Lactose Indicates Uses, Limitations As a Substitute For Sucrose In Bakery Goods", *Food Product Development*, 10(6), pages 85–88 (1976).

In the present invention, a multitextured cookie having a shelf-stable plurality of textures contains lactose and/or dextrose in at least one layer which has a firm and tender texture.

SUMMARY OF THE INVENTION

The present invention provides a cookie dough composition for producing cookies having a shelf-stable plurality of textures. At least one dough layer of the composition comprises lactose and/or dextrose and is bakeable to a firm and tender textured crumb structure. The remaining one or more dough layers comprises a humectant and is bakeable to a moist, cake-like soft or chewy textured crumb structure.

To provide the clean-tasting sweetness of sucrose, to control the degree of browning upon baking, and to reduce the possibility of an allergic reaction to lactose, sucrose may be used in an amount less than 75% by weight, based upon the total sugar solids content of the casing dough. The lactose and/or dextrose may be used in a total amount greater than 25% by weight, typically from about 30% by weight, up to about 60% by weight of the total weight of the sugars in the casing dough. The dough compositions of the present invention preferably comprise dough pieces having the dough bakeable to a moist, soft or chewy texture (filler dough) enrobed completely or partially within the dough bakeable to a firm and tender texture (casing dough). Cookies baked from the enrobed dough pieces have a shelf-stable consumer discernible textural dichotomy of a firm and tender outer portion and a moist, soft and chewy inner portion.

DETAILED DESCRIPTION OF THE INVENTION

While promotion of browning is generally desireable in the production of cookies, the levels of lactose and/or dextrose used in the present invention should not result in coloration of the cookie which is incompatible with the type of cookie. For example, a chocolate fudge cookie may undergo more browning than a sugar or butter cookie without adversely affecting its appearance.

To provide the clean-tasting sweetness of sucrose, to control the degree of browning upon baking, and to reduce the possibility of an allergic reaction to lactose, sucrose is used in an amount less than 75% by weight, based upon the total sugar solids content of the casing dough. Other sugars may be employed with the sucrose to enhance sweetness or control oven spread in amounts which do not adversely affect the retention of a multiple texture over extended periods of time. Generally, the higher the relative sweetness the smaller is the amount which is used. Suitable amounts will also depend upon the relative amounts of lactose and dextrose. Exemplary of a sugar which may be used with the lactose and/or dextrose is fructose. Suitable sources include invert syrup, honey, molasses, brown sugar, maple syrup, and the like. Typically, the amount of fructose may range up to about 5% or more, based upon the total sugar solids content of the casing dough. The lactose and/or dextrose may be used in a total amount greater than 25% by weight, typically from about 30% by weight, up to about 60% by weight, based upon the total sugar solids content of the casing dough.

The lactose and dextrose may be supplied in pure form or as a commercially available source of the sugar which is compatible with the desired texture, coloration, taste, and odor of the cookie. Pure forms of the sugar are preferred. Crystalline forms or aqueous solutions of the sugar may be used.

Suitable sources of lactose include milk products, such as non-fat dry milk which contains approximately 52% lactose, and whey which contains over 70% lactose. Lactose may be used in its alpha or beta form. The alpha isomer is commercially available as the monohydrate. The beta form is anhydrous. The alpha form is produced by crystallization from solution below 93.5° C. Beta lactose is crystallized from solution above 93.5° C. When either form is dissolved in water, mutarotation occurs until equilibrium is established between the two isomers.

Suitable commercially available sources of dextrose include the anhydrous crystalline form, the monohydrate crystalline form, and aqueous solutions of dextrose or glucose solids. Crystalline forms are preferred.

The humectant used in the one or more soft or chewy layers or in the inner portion of the cookies should absorb and bind or hold water so as to impart a shelf-stable softness or chewiness. The binding should be such that the equilibrium rate of moisture loss from the baked product to the environment due to the presence of the humectant is slowed to such a degree that a baked product containing the humectant, and having an initial moisture content of at least about 6% by weight, exclusive of inclusions: (1) retains a soft and pliable texture in the portion baked from the filler dough, (2) retains a firm and tender texture in the portion baked from the casing dough, and (3) the retention of the multiple texture is for at least about two months, and preferably for at least about 6–12 months when the cookie is stored in a closed container.

Humectant sugars may be employed alone or in combination with other sugars in the filler cookie dough to impart a soft or chewy texture to the center of the multitextured cookie. Suitable humectant sugars include fructose, corn syrups, invert syrups, high fructose corn syrups, honey, molasses, as well as mixtures of one or more of the foregoing humectants. For example, a suitable humectant sugar composition for use in the filler cookie dough may comprise about 0 to 85 percent sucrose, with the balance of the sugar being comprised of fructose employed in the form of crystallized sugar. Alternatively, the balance of the sugar may be provided by the sugar solids content of a corn syrup, honey or a high fructose corn syrup, or another humectant sugar.

Commercially available high fructose corn syrups are the preferred humectants. They are low in cost, are highly humectant, provide a pleasant sweet taste, and are readily commercially available. They are prepared by the enzymatic isomerization of dextrose containing corn syrups, and typically possess a sugar solids component of about 40 percent to about 100 percent by weight fructose, with the balance of the non-fructose sugar solids being primarily dextrose plus minor amounts of other monosaccharides. The sugar solids content of commercially available high fructose corn syrups typically ranges from about 70 percent to about 73 percent, up to about 82 percent by weight. High fructose corn syrups having at least about 80% by weight of their solids as fructose are most preferred. Examples of other humectant sugars include maltose, sorbose, mannose, and galactose. When sucrose is employed in the filler cookie dough, the humectant sugar should comprise at least about 15 percent, and preferably at least about 20 percent, by weight of the total sugar solids content of the filler cookie dough.

In addition to the humectant sugars, humectants, or aqueous solutions of humectants which are not sugars or possess a low degree of sweetness relative to sucrose may also be employed in the filler cookie dough. For example, the use of glycerol, sugar alcohols such as mannitol, maltitol, xylitol and sorbitol, and other polyols, as humectants is well known in the art. Additional examples of humectant polyols (i.e. polyhydric alcohols) include humectant glycols, for example propylene glycol and hydrogenated glucose syrups. Other humectants include sugar esters, dextrins, and other starch hydrolysis products. However, the humectant sugars are preferred because of their sweetness.

The humectant may be included in the dough as an added ingredient, or an enzyme may be included in the dough formulation which acts on a substrate also included in the dough during, before or after baking, to produce effective amounts of the humectant in situ in the dough. Examples of suitable enzymes for the purpose include invertase which effects the inversion of sucrose to invert sugar, as well as other glycosidases and polysaccharidases which after acting on carbohydrates present in the dough produce humectants as the by-products of their enzymatic activity.

Enzymes suitable for use in this manner include polysaccharidases which act upon farinaceous materials to produce lower molecular weight saccharides such as glucose, maltose, modified starches, dextrins, etc. Enzymes of this type include alpha- and beta- amylases. Alpha-amylases, such as those obtained from bacterial sources (*Bacillus subtilis* or *B. mesintericus*) are known to be heat-stable, and have been reported to be able to retain some activity at temperatures as high as 10020 C. The number of SKB units of amylase enzyme per 100 grams of flour will typically be about 6 to 1000 units. Pregelatinized starch may be added to the dough to produce a readily available substrate for the enzyme. SKB units may be assayed by the method of Sandstetde, Kneen and Blish, described in Cereal Chemistry, 16, 712 (1939). Amylase enzymes are commercially available, and include Fresh-N, a product of G. B. Fermentation Industries Inc., Charlotte, N.C. as well as Termanyl and Bacterial Amylase Novo (Ban) which are products of Novo Industry A/S, Novo Alle, DK-2880, Bagsvaerd, Denmark.

Edible humectant gels such as a humectant sucrose gel and/or a high fructose corn syrup gel can be used in the filler cookie dough for achieving a soft and chewy texture which is stable for prolonged periods. Preparation of the gels and of doughs containing them for producing soft edible baked products having extended shelf life is taught in U.S. Pat. No. 4,624,856 and commonly assigned pending U.S. application Ser. No. 580,365, filed Feb. 16, 1984, which is a continuation-in-part of the application which issued as U.S. Pat. No. 4,444,799. The aforementioned patent is herein incorporated herein by reference in its entirety.

In accordance with the teachings of U.S. Pat. No. 4,624,856, a firm gel, capable of being ground is obtained by admixing: (a) from about 0.25 parts by weight to about 4.0 parts by weight, preferably from about 0.5 parts by weight to about 1.5 parts by weight of an edible gum capable of being set by calcium ions, and (b) from about 0.1 parts by weight to about 4 parts by weight, preferably from about 0.25 parts by weight to about 1.0 parts by weight of a calcium ion source, said parts being based upon 100 parts by weight of the edible viscous liquid. The ingredients are admixed under high shear mixing conditions which assures an at least substantially lump-free and homogeneous gel.

The edible firm, elastic or rubbery gel is ground into pieces typically at temperatures of from about 65° F. to about 85° F. The ground gel is incorporated into a dough using conventional mixing techniques known in the bakery art. The ground gel which is incorporated into the dough is not discernible as pieces in the baked good upon consumption. The amount of water used to produce the gels generally ranges from about 15% by weight to about 35% by weight, based upon the total weight of the gel.

A humectant gel for use in the present invention can be prepared by using sucrose syrup and/or high fructose corn syrup as the edible viscous liquid, sodium alginate as the edible gum, and food grade calcium sulfate dihydrate as the calcium ion source. Other gums which may be employed include potassium alginate, ammonium alginate, carrageenan, guar gum, locust bean gum, starch, protein, Xanthan gum, mixtures thereof, and the like. Other calcium ion sources which may be employed include food grade monocalcium phosphate anhydrous, calcium sulfate, calcium carbonate, calcium lactate, calcium monohydrogen phosphate, dicalcium orthophosphate dihydrate, tricalcium phosphate, calcium chloride, mixtures thereof, and the like. Weight ratios of sodium alginate/edible calcium ion source in the range of about 1 to 3 are generally used.

The total sugar solids content of the casing dough bakeable to the firm and tender one or more layers or outer portion of the cookie of the present invention may range from about 0.25 to about 1.5 parts by weight per 1.0 part by weight per 100 pounds of the flour component of the dough, depending upon the degree of sweetness desired in the outer portion of the cookie, and the type of cookie. The total sugar solids content includes sucrose, the dextrose and/or lactose, and the optional humectant sugars.

In the filler dough bakeable to a cake-like moist, soft or chewy textured crumb structure, on the basis of 1.0 part by weight of the flour component of the filler dough, the humectant plus any sucrose or other sweetener employed (e.g. artificial sweeteners, lactose and/or dextrose) in the formulation may be present in amounts ranging from about 0.25 to about 1.5 parts by weight depending on the degree of sweetness and humectant properties desired in the baked product.

Typically, the total sugar solids content (exclusive of inclusions) of each of the filler and casing doughs is from about 0.5 to about 1.1 parts by weight of sugar per 1.0 part by weight of the flour component of the filler and casing doughs, respectively. The total sugar solids content of the filler dough is typically at least 20% more than the total sugar solids content of the casing dough, based upon 1.0 part by weight of the flour component of the filler and casing dough, respectively.

The flour and shortening employed in the filler and casing cookie doughs used in the process and dough composition of the present invention are selected from conventional ingredient lines. They may be the same or different in each dough. The flour component may be any comminuted cereal grain or edible seed meal such as wheat flour, corn flour, corn starch, modified starch, rice flour, potato flour, barley flour, or the like. Wheat flour is preferred, and may be bleached or unbleached. Bleached flour tends to produce less oven spread during baking.

The shortening may be any edible fat or oil or mixtures thereof suitable for baking applications, and may further include conventional food-grade emulsifiers. The shortening may be present in each dough in amounts ranging from about 20 percent to about 80% by weight based upon the weight of flour in the dough.

Each of the doughs may contain up to about 5 percent by weight of a leavening system, based upon the weight of the flour in each dough. The leavening system employed in each dough may be the same or different.

To promote a tender, non-cohesive cake-like soft or chewy textured crumb structure, it is desirable to include one or more emulsifiers and/or pregelatinized starch in the filler cookie dough. Suitable amounts are up to about 3% by weight of one or more emulsifiers and up to about 12% by weight of one or more pregelatinized starches, each percent being based upon the weight of the flour. Exemplary of pregelatinized starches are pregelatinized corn, wheat, and waxy maize starch. Typical emulsifiers which can be used include sorbitan monostearate, mono- and/or di-glycerides, polyoxyethylene sorbitan fatty acid esters, such as polysorbates (e.g., polyoxyethylene (20) sorbitan monostearate), and sodium stearoyl-2-lactate.

The initial moisture content of the casing dough and of the filler dough are each adjusted to provide the desired consistency to the dough to enable proper mixing, working and shaping of each dough and of the composite dough. The total moisture content of the filler and casing doughs will include any water included as a separately added ingredient, as well as the moisture provided by flour (which usually contains about 12% to about 14% by weight moisture), the moisture provided by the optional humectant gel, and the moisture content of other dough additives included in the formulation, such as high fructose corn syrup, invert syrups, or other liquid humectants. Taking into account all sources of moisture in the dough, including separately added water, the total initial moisture content of the casing dough is generally less than about 15% by weight of the dough formulation, exclusive of particulate inclusions such as nuts, raisins, chocolate chips, and the like. At moisture contents above about 15% by weight, the dough compositions may tend to stick excessively to processing equipment such as conveyors, dough cutters, and the like.

The initial moisture content of the filler cookie dough is generally at least about 15% by weight more than the initial moisture content of the casing cookie dough. The higher moisture content of the filler dough facilitates control over the water content of the cookie.

In addition to the foregoing, the filler and casing cookie doughs used in the process and dough composition of the invention may include other additives conventionally employed in cookies. Such additives may include, for example, milk by-products, egg or egg by-products, cocoa, vanilla, cereal (oatmeal) as well as inclusions such as nuts, raisins, coconut, flavored chips such as chocolate chips, butterscotch chips and caramel chips, and the like.

The filler and casing cookie doughs can each be prepared in a conventional manner using a creaming stage and a dough-forming stage. The lactose and/or dextrose is conveniently mixed in during the creaming stage of the casing dough preparation. The dextrose, lactose, and/or source thereof, and at least part of the sucrose are conveniently mixed with the fat or shortening in the creaming stage before the flour and any remaining sucrose are added. The optional humectant sugars which are in liquid form, such as molasses or high fructose corn syrup, are suitably added with water prior to addition of the flour.

If flavor chips are to be added to either or both cookie doughs, they are preferably added as the last ingredient to the dough with minimal mixing so as to avoid smearing of the flavor chips into the dough. Before being combined with the casing dough, the filler dough is preferably cooled to about 60° to about 65° F. (about 15.6° to about 18.3° C.) using carbon dioxide snow to facilitate its transfer through a coextruder or other dough forming device.

The two cookie doughs may be combined by coextrusion through concentric dies to obtain a coextrudate rope with the filler cookie dough inside and the casing cookie dough outside. The coextrudate rope is cut into pieces using a reciprocating cutter or other cutter which severs the rope and stretches the casing dough to close the end portions of the rope so as to obtain an enrobed dough piece which is bakeable to the cookie of the present invention. Apparatus for forming a composite dough piece in which a center formed of the filler cookie dough is surrounded by or is enrobed by an outer layer formed of the casing cookie dough is described in detail in copending U.S. application Ser. No. 540,982 entitled "High Production Method and Apparatus for Forming Filled Edible Products", and in copending U.S. application Ser. No. 540,983 entitled "Apparatus Having Shims Underlying Portions of a Die", both filed in the name of William Simelunas on Oct. 11, 1983, now U.S. Pat. Nos. 4,528,900 and 4,534,726, respectively. These copending applications are herein incorporated by reference.

The composite dough pieces suitably have a weight ratio of the filler dough to the casing dough within the range from about 0.80 to 1.2, approximately equal amounts of each dough being preferred.

The time and temperature of baking are adjusted in accordance with conventional techniques to provide a moisture content in the baked cookie of 6 percent or more, based upon the weight of the cookie, inclusive of inclusions such as flavor chips. A typical multitextured chocolate chip cookie produced in accordance with the present invention has a moisture content (Brabender 145° C., 12 minutes) of from about 7% to about 8.5% by weight, based upon the total weight of the cookie, which includes chocolate chips throughout the cookie. Moisture contents are determined by first grinding the cookies and then using conventional moisture analysis techniques on the ground sample. Exemplary of such techniques are Brabender (set at 145° C., for 12 minutes) analysis or vacuum oven (set at 70° C. for 24 hours) analysis, with appropriate correlation.

The water activity of the baked cookie should be less than about 0.7, preferably less than or equal to about 0.65, to assure microbial shelf stability. While baking times and temperatures will vary for different dough formulations, oven types, etc., in general commercial cookie baking times may range from about 5 minutes to about 15 minutes and baking temperatures for cookies may range from about 250° F. (121° C.) to about 500° F. (260° C.).

As employed herein, the term "chewy" is intended to define textures which possess a discernible degree of plasticity. Chewiness also connotes impressions of softness and moistness. Firm and tender connotes initial or momentary retention of an unaltered form upon biting. Firm and tenderness and chewiness can be described in terms of taste panel tests which take as standards the texture of fresh saltine crackers having a moisture content of about 2% (rating of 0) and a freshly baked cookie having a distinctly chewy texture throughout (rating of 10): i.e., chewy cookies prepared in accordance with the following recipe:

| ⅔ cup | sugar |
|---|---|
| ¼ cup | butter or regular margarine |
| 1 tsp. | ground ginger |
| ½ tsp. | ground cinnamon |
| ½ tsp. | baking soda |
| ½ tsp. | salt |
| ½ tsp. | vanilla |
| 1 | egg |
| ½ cup | honey |
| 1½ cup | sifted flour |

The cookies are prepared by combining 2/3 cup of sugar, butter, ginger, cinnamon, baking soda, salt and vanilla in a large mixing bowl and creaming the ingredients until they are light and fluffy. Next the eggs are added and beat in until the mixture is very fluffy. The honey is then blended in, followed by the blending in of the flour a little at a time. The dough is dropped in teaspoonfuls 2½ inches apart onto a lightly greased baking sheet, baked at 350° F. (177° C.) for 10 to 15 minutes until lightly browned and removed at once from the baking sheet to racks to cool thoroughly.

Employing the rating scale described above, the moist, cake-like, soft or chewy center of the cookie produced by the process of this invention preferably has a rating of at least 3 and most preferably at least 5. The firm and tender outer portion preferably has a rating of less than 5 and most preferably less than 2. The regions should show a difference in ratings of at least 2 units, and most preferably at least 5 units, for at least two months, preferably for at least 6 months, when properly packaged.

The cookie dough compositions of the present invention may be used for the production of drop-type cookies, such as chocolate chip cookies, oatmeal cookies, chocolate fudge cookies, peanut butter cookies, sugar cookies, butter cookies, and the like.

The present invention is further illustrated in the following examples where all parts, ratios, and percentages are by weight and all temperatures are in °F., unless otherwise stated:

EXAMPLE 1

A dual-textured chocolate chip cookie is prepared by coextruding an inner or filler cookie dough bakeable to a moist, cake-like soft or chewy texture with an outer or casing cookie dough bakeable to a firm and tender texture through a concentric die into a coextrudate rope. The rope is severed with a reciprocating cutter having hemispherically shaped dough forming sections into enrobed dough pieces. The weight of the inner ball of dough is about equal to the weight of the outer dough.

The ingredients and their relative amounts used to prepare the casing dough bakeable to a firm texture and having a calculated sugar solids content of about 15% lactose, 15% dextrose, 0.4% fructose, and the balance essentially sucrose, based upon the total sugar solids content of the casing dough were:

| Casing Ingredient | Parts By Weight |
|---|---|
| Bleached medium wheat flour (about 12% H$_2$O) | 100.0 |
| Dextrose monohydrate, powdered | 11.44 |
| Sucrose | 49.0 |
| Lactose | 10.69 |
| Molasses, sugar cane | 2.5 |
| Vegetable shortening | 60.0 |
| Sodium bicarbonate | 2.63 |
| Sodium acid pyrophosphate | 0.75 |
| Salt | 1.5 |
| Spray dried whole eggs | 1.0 |
| Flavoring | 0.14 |
| Coloring | 0.21 |
| Chocolate drops (4800 count) | 50.0 |
| Water | 18.5 |

The sugars were all used in their commercially-available forms. The sucrose was fine granulated #1 sugar consisting of essentially 100% sucrose. The dextrose contained 92% solids, essentially 100% of which was dextrose. The lactose contained 98% solids, essentially 100% of which was lactose. The spray dried egg used contained 97% solids, of which 29% was sugar, essentially all sucrose. The molasses contained about 80% solids, of which about 30% was sucrose and about 32% was invert sugar (about 50% dextrose and 50% fructose).

This casing dough was prepared using an upright mixer running at low speed. One-third of the sucrose, together with the shortening, spray, oil, dextrose, lactose, salt, dried eggs, and flavoring was placed in the mixing bowl and mixed for 3 minutes to obtain a smooth consistency. The molasses, coloring and water were then added and the mixing continued for 1 minute. The flour, sodium bicarbonate and sodium acid pyrophosphate were added and the mixing continued for a further 2 minutes. The remaining sucrose was then added and the mixing continued for a further 2 minutes. Finally, the chocolate chips were added at 60° F. (15.6° C.) and the mixing was continued for a further 1 minute to prepare the finished casing dough. The ingredients and their relative amounts used to prepare the filler dough bakeable to a soft or chewy texture were:

| Filler Ingredients | Parts By Weight |
| --- | --- |
| Bleached medium wheat flour (about 12% H₂O by weight) | 100.0 |
| Chocolate drops (4200 count) | 75.0 |
| Sucrose | 25.0 |
| Vegetable shortening | 38.0 |
| High fructose corn syrup (about 72% solids; 42% fructose, 50% dextrose) | 88.5 |
| Sodium bicarbonate | 1.25 |
| Ammonium bicarbonate | 0.25 |
| Sodium acid pyrophosphate, anhydrous | 0.31 |
| Modified corn starch | 8.5 |
| Non-fat dry milk (about 52% lactose) | 4.0 |
| Spray dried whole eggs (29% sucrose, 97% solids) | 1.5 |
| Salt | 1.5 |
| Coloring | 0.19 |
| Flavoring | 0.15 |
| Water | 11.0 |

The filler dough was prepared using the same upright mixer and low mixing speed as used in preparing the casing dough. The sucrose, vegetable shortening, starch, dried milk, dried eggs, salt, flavoring and 15% by weight of the flour were placed in the mixing bowl and mixed for 3 minutes. The ammonium bicarbonate was then dissolved in part of the water and added to the mixing bowl, together with the coloring and the remaining water. The mixing was continued for 2 minute. The high fructose corn syrup was then added, the mixture cooled with carbon dioxide snow, and then the mixing was continued for a further 1 minute. The remaining flour, the sodium bicarbonate, and sodium acid pyrophosphate, were added and the mixing continued for a further 3 minutes The chocolate drops were added, and the mixing continued for a further 1 minute to produce the finished filler dough with a temperature of about 60° F. to 62° F.

The enrobed cookie preform, or composite dough, prepared from the casing dough and filler dough was baked to an end point moisture content of about 7.3% by weight, based upon the weight of the cookie, and cooled at room temperature. The moisture content was determined by grinding a sample of about 12 ounces of cookies into a homogeneous mixture and measuring the moisture content of the mixture on a Brabender moisture analyzer set at 145° C. for 12 minutes. The cookies had a pH of about 7.5. The cookies were stored in a closed container at room temperature until the moisture in the cookies equilibrated between the firm and chewy regions of the cookie. The outer dough portion had a firm and tender textured crumb structure and the inner dough portion possessed a cake-like soft and plastic crumb matrix having a distinctly leavened appearance.

EXAMPLE 2

A dual textured chocolate chip cookie can be prepared as in Example 1 except: (1) the dried eggs can be eliminated in the casing and (2) the relative amounts of the following casing ingredients can be altered to:

| Casing Ingredient | Parts By Weight |
| --- | --- |
| Sucrose | 52.5 |
| Dextrose monohydrate | 13.69 |
| Lactose | 8.0 |
| Water | 17.0 |

On a calculated basis the casing dough would have about 10% lactose, 17% dextrose, 0.4% fructose, and the balance essentially sucrose, based upon the total sugar solids content of the casing dough.

EXAMPLE 3

A dual textured chocolate chip cookie was prepared as in Example 1 except the relative amounts of the following casing ingredients were altered to:

| Casing Ingredient | Parts by Weight |
| --- | --- |
| Sucrose | 42.0 |
| Dextrose monohydrate | 15.25 |
| Lactose | 14.25 |
| Water | 21.0 |

On a calculated basis, the casing dough has about 20% lactose, 20% dextrose, 0.4% fructose, and the balance essentially sucrose, based upon the total sugar solids content of the casing dough.

The composite dough was baked to an end point mositure content of 7.5% (Brabender set at 145°C. for 12 minutes) and the pH of the cookies was about 7.5.

EXAMPLE 4

A dual textured chocolate chip cookie was prepared as in Example 1 except: (1) the molasses and dextrose monohydrate were eliminated in the casing, (2) the relative amount of lactose in the casing was altered to 21.2 parts instead of 10.69 parts by weight, and (3) the dough pieces were baked to an end point moisture content of 7% (Brabender set at 145° C. for 12 minutes).

On a calculated basis, the casing dough has about 30% lactose and about 70% sucrose, based upon the total sugar solids content of the casing dough.

EXAMPLE 5

Dual textured chocolate chip cookies can be produced as in Examples 1 through 4 except in the filler dough: (1) the high fructose corn syrup can be replaced by 88.5 parts by weight of a high fructose corn syrup having about 77% solids, of which about 90% is fructose, 7% is dextrose and 3% is other sugars, and the water can be increased to 15 parts by weight.

EXAMPLE 6

Dual textured chocolate chip cookies can be produced as in Example 1 except a sheet or layer of the filler dough can be laminated on a sheet or layer of the casing dough followed by lamination of another sheet or layer of the casing dough on the sheet of the filler dough. The sheeted composite dough can be cut into rectangular pieces with a suitable cutter prior to or after baking.

EXAMPLE 7

Dual textured chocolate chip cookies can be produced as in Example 1 except: (1) the 49 parts by weight of sucrose and the 10.69 parts by weight lactose can be replaced by 60 parts by weight lactose.

On a calculated basis, the casing dough would have about 16.1% dextrose, 82.2% lactose, 0.4% fructose and the balance essentially sucrose, based upon the total sugar solids content of the casing dough.

What is claimed is:

1. A cookie having a shelf stable plurality of textures comprising:
    (a) a first portion having a soft or chewy textured crumb structure baked from a filler cookie dough comprising flour, shortening or fat, and a humectant for imparting softness or chewiness to the first portion, and
    (b) a second portion having a firmer and tender textured crumb structure laminated to said first portion, said second portion being baked from a casing cookie dough comprising flour, sucrose, shortening or fat, and at least one member selected from the group consisting of lactose and dextrose in a total amount which is greater than 25% by weight, based upon the total sugar solids content of the casing dough, the sucrose content of the casing dough being less than 75% by weight, based upon the total sugar solids content of the casing dough, said cookie having a water activity of less than about 0.7, the dual texture of a firmer and tender second portion and a soft or chewy first portion being shelf stable for at least two months when the cookie is packaged in a closed container.

2. A cookie as claimed in claim 1 wherein the humectant comprises a humectant sugar.

3. A cookie as claimed in claim 2 wherein the humectant comprises a high fructose corn syrup, the solids content of the high fructose corn syrup being at least about 80 percent by weight fructose.

4. A cookie as claimed in claim 3 wherein the solids content of the high fructose corn syrup is from about 68% by weight to about 82% by weight, based upon the weight of the high fructose corn syrup.

5. A cookie as claimed in claim 4 wherein the dough baked to said second portion has a total lactose and dextrose content, on a sugar solids basis, of about 30% to about 60% by weight.

6. A cookie as claimed in claim 4 wherein the water activity of the cookie is less than about 0.65 and the water content of the cookie is at least 6% by weight.

7. A cookie as claimed in claim 1 wherein said humectant comprises a firm sucrose-based gel formed from sucrose, water, sodium alginate, and an edible calcium ion source.

8. A cookie as claimed in claim 1 wherein said humectant comprises a firm high fructose corn syrup-based gel formed from a mixture comprising high fructose corn syrup, sodium alginate, and an edible calcium ion source.

9. A cookie as claimed in claim 2 which is a chocolate chip cookie.

10. A cookie as claimed in claim 9 wherein the moisture content of the cookie is from about 7% to about 8.5% by weight of the cookie.

11. A cookie as claimed in claim 1 wherein the humectant comprises a high fructose corn syrup, and said second portion enrobes said first portion.

12. A cookie as claimed in claim 11 wherein the lactose content of said dough bakeable to said second portion is greater than 25% by weight, based upon the total sugar solids content of the dough bakeable to said second portion.

13. A cookie as claimed in claim 11 wherein the dextrose content of said dough bakeable to said second portion is greater than 25% by weight, based upon the total sugar solids content of the dough bakeable to said second portion.

14. A cookie as claimed in claim 11 wherein the total dextrose and lactose content of said dough bakeable to said second portion is greater than 25% by weight, based upon the total sugar solids content of the dough bakeable to said second portion.

15. A cookie as claimed in claim 5 wherein the casing dough baked to said second portion has a total sugar solids to flour weight ratio of from about 0.5 to about 1.1 parts of sugar to 1.0 part of flour, and the filler dough baked to said first portion has a total sugar solids to flour weight ratio of from about 0.5 to about 1.1 parts of sugar to 1.0 part of flour.

16. A cookie as claimed in claim 15 wherein said casing dough has a lactose content of about 15% by weight and a dextrose content of about 15% by weight, based upon the total sugar solids content of the casing dough, and said filler cookie dough comprises sucrose and a humectant sugar, the humectant sugar being at least about 20% by weight of the total sugar solids content of the filler dough.

17. A cookie as claimed in claim 15 wherein said casing dough has a lactose content of about 20% by weight and a dextrose content of about 20% by weight, based upon the total sugar solids content of the casing dough, and said filler cookie dough comprises sucrose and a humectant sugar, the humectant sugar being at least about 20% by weight of the total sugar solids content of the filler dough.

18. A cookie as claimed in claim 17 wherein said filler dough has a sucrose content of about 25 pounds per 100 pounds of the flour of the filler dough.

19. A cookie dough composition for producing cookies having a shelf stable plurality of textures comprising:
    (a) a filler cookie dough bakeable to a soft or chewy texture comprising flour, shortening or fat, and a humectant for imparting softness or chewiness to the baked dough, the weight ratio of the total sugar solids content of the filler dough per part by weight of the flour of the filler dough being from about 0.5 to about 1.1 parts by weight, and
    (b) a casing dough bakeable to a firmer and tender texture laminated to said filler dough, said casing dough comprising flour, sucrose, shortening or fat, and at least one member selected from the group consisting of lactose and dextrose in a total amount of from about 30% by weight to about 60% by weight, based upon the total sugar solids content of the casing dough, the weight ratio of the total sugar solids content of the casing dough per part by weight of the flour of the casing dough being from about 0.5 to about 1.1 parts by weight, said cookie dough composition being bakeable to a cookie having a water activity of less than about 0.7, and having a dual texture of a firmer and tender baked casing and a soft or chewy baked filler which is shelf stable for at least two months when the cookie is packaged in a closed container.

20. A cookie dough composition as claimed in claim 19 wherein said casing dough has a lactose content of about 15% by weight and a dextrose content of about 15% by weight, based upon the total sugar solids content of the casing dough, and said filler cookie dough comprises sucrose and a humectant sugar, the humectant sugar being at least about 20% by weight of the total sugar solids content of the filler dough.

21. A cookie dough composition as claimed in claim 20 wherein said casing dough has a lactose content of about 20% by weight and a dextrose content of about 20% by weight, based upon the total sugar solids content of the casing dough, and said filler cookie dough comprises sucrose and a humectant sugar, the humectant sugar being at least about 20% by weight of the total sugar solids content of the filler dough.

22. A method for producing a cookie having a shelf-stable plurality of textures comprising:
    (a) coextruding a filler cookie dough bakeable to a soft or chewy texture and a casing cookie dough bakeable to a firmer and tender texture, said filler dough comprising flour, shortening or fat, and a humectant for imparting softness or chewiness to the baked filler dough, said casing dough comprising flour, shortening or fat, sucrose, and at least one member selected from the group consisting of lactose and dextrose in a total amount which is greater than 25% by weight, based upon the total sugar solids content of the casing dough, the sucrose content of the casing dough being less than 75% by weight, based upon the total sugar solids content of the casing dough,
    (b) severing the coextrudate into pieces to enrobe the filler cookie dough, and
    (c) baking the pieces to obtain cookies having a water activity of less than about 0.7, a moisture content of at least about 6% by weight, based upon the weight of the cookie, and a plurality of textures which is shelf stable for at least two months when the cookie is packaged in a closed container.

23. A method as claimed in claim 22 wherein said casing dough comprises lactose.

24. A method as claimed in claim 22 wherein the weight ratio of said filler dough to said casing dough ranges from about 0.80 to about 1.2, and the moisture content of the filler dough is at least about 15 percent by weight more than the moisture content of the casing dough.

25. A method as claimed in claim 24 wherein the casing dough comprises a mixture of lactose and dextrose.

26. A method as claimed in claim 25 wherein said humectant comprises a high fructose corn syrup having a solids content of from about 68% by weight to about 82% by weight, based upon the weight of the high fructose corn syrup.

27. A method as claimed in claim 26 wherein the fructose content of the high fructose corn syrup is at least about 80% by weight, based upon the weight of said sugar solids content.

28. A method as claimed in claim 22 wherein the casing dough has a total lactose and dextrose content, on a sugar solids basis, of about 30% to about 60% by weight.

29. A method as claimed in claim 28 wherein the cookie is a chocolate chip cookie.

30. A method as claimed in claim 22 wherein said casing dough has a total sugar solids to flour weight ratio of from about 0.5 to about 1.1 parts of sugar to 1.0 part of flour, and the filler dough has a total sugar solids to flour weight ratio of from about 0.5 to about 1.1 parts of sugar to 1.0 part of flour.

31. A method as claimed in claim 30 wherein said casing dough has a lactose content of about 15% by weight and a dextrose content of about 15% by weight, based upon the total sugar solids content of the casing dough, and said filler cookie dough comprises sucrose and a humectant sugar, the humectant sugar being at least about 20% by weight of the total sugar solids content of the filler dough.

32. A method as claimed in claim 30 wherein said casing dough has a lactose content of about 20% by weight and a dextrose content of about 20% by weight, based upon the total sugar solids content of the casing dough, and said filler cookie dough comprises sucrose and a humectant sugar, the humectant sugar being at least about 20% by weight of the total sugar solids content of the filler dough.

* * * * *